United States Patent
Meissner et al.

(10) Patent No.: US 7,037,610 B2
(45) Date of Patent: May 2, 2006

(54) HUMIDIFICATION OF REACTANT STREAMS IN FUEL CELLS

(75) Inventors: Alan P. Meissner, Franklin, WI (US); Mark G. Voss, Franksville, WI (US); Gregory G. Hughes, Milwaukee, WI (US); Joseph R. Stevenson, Kenosha, WI (US); Liping Cao, Kenosha, WI (US)

(73) Assignee: Modine Manufacturing Company, Racine, WI (US)

( * ) Notice: Subject to any disclaimer, the term of this patent is extended or adjusted under 35 U.S.C. 154(b) by 567 days.

(21) Appl. No.: 10/246,223

(22) Filed: Sep. 18, 2002

(65) Prior Publication Data

US 2004/0053095 A1    Mar. 18, 2004

(51) Int. Cl.
    *H01M 8/18* (2006.01)

(52) U.S. Cl. .................. 429/19; 429/20; 429/22; 429/24; 429/25; 429/26; 429/34; 429/38; 429/39

(58) Field of Classification Search .......... 429/19, 429/20, 22, 24, 25, 26, 34, 38, 39
See application file for complete search history.

(56) References Cited

U.S. PATENT DOCUMENTS

| 5,360,679 | A | 11/1994 | Buswell et al. |
| 6,607,854 | B1* | 8/2003 | Rehg et al. ............... 429/13 |
| 6,713,204 | B1* | 3/2004 | Shimanuki et al. ......... 429/26 |
| 2001/0021468 | A1 | 9/2001 | Kanai et al. |
| 2002/0061426 | A1 | 5/2002 | Imaseki et al. |

FOREIGN PATENT DOCUMENTS

WO    WO 02/061867 A2    8/2002

OTHER PUBLICATIONS

Preliminary Search Report dated May 17, 2005.

* cited by examiner

*Primary Examiner*—Bruce F. Bell
(74) *Attorney, Agent, or Firm*—Wood, Phillips, Katz, Clark & Mortimer

(57) ABSTRACT

Energy consumption is minimized in the fuel cell system including a fuel cell 10 having a fuel inlet 14, an oxidant inlet 12, a cathode gas outlet 16 and an anode tail gas outlet 18. At least one humidifier 52,70; 54,72, is interposed between a source of air or fuel and includes an interior energy containing medium flow path 60,61; 62,64; 78,80; 72,84 in heat exchange relation with a reactant flow path 56,58; 74,76 together with a source 46 of water connected to the reactant flow path 56;58; 74,76 to be vaporized therein. The energy containing medium flow path 60,61; 62,64; 78,80; 82,84 is connected to one of the outlets 16,18 to receive a heated fluid therefrom to provide the heat of vaporization to the aqueous material.

12 Claims, 2 Drawing Sheets

HUMIDIFICATION OF REACTANT STREAMS IN FUEL CELLS

FIELD OF THE INVENTION

This invention relates to fuel cells wherein reactant streams require humidification.

BACKGROUND OF THE INVENTION

Many fuel cells conventionally employ internal membranes. One example of such fuel cells are the so-called PEM type which have proton exchange membranes, also referred to as polymer electrolyte membranes. The membranes, in order to perform properly, must be kept moist and must not be subjected to inordinately high temperatures.

To provide proper operation of a fuel cell system, it is therefore necessary that means be provided so that the fuel cell membranes are wetted to the proper degree to avoid damage to or shorten the life of the membranes as well as to maintain a desired, high degree of efficiency of operation.

Moreover, in some fuel cell systems, reformers are required to convert a hydrogen-containing organic material to a hydrogen rich fuel stream for consumption within the fuel cell. Various hydrogen-containing organic compounds have been suggested for the purpose including methanol, ethanol, natural gas, conventional gasolines, diesel fuel, propane, butane, etc. In the case of certain of these materials, it is necessary to humidify the incoming gas stream prior to its admission to the reformer to achieve the desired conversion to a hydrogen rich fuel stream.

Further, in fuel cell systems, it is also highly desirable that the incoming fuel and oxidant streams be at a desired operating temperature of the fuel cell and be at a desired range of relative humidity to maximize membrane efficiency over a wide range of operating conditions of the fuel cell, particularly where loading of the fuel cell varies over a substantial range.

In the usual case, humidification and/or temperature control of the various streams that may require humidification is achieved by heating water or another aqueous water-based material to cause the same to evaporate within the stream and raise the relative humidity thereof. This, of course, requires the expenditure of energy to generate the heat of vaporization. As fuel cell efficiencies are desirably maximized, it is highly desirable that the energy expended in the fuel cell system for providing the desired heat for humidification purposes be minimized or at least obtained in a way such that the fuel requirements of the fuel cell system are minimized.

The present invention is directed to meeting the above needs.

SUMMARY OF THE INVENTION

It is the principal object of the invention to provide a new and improved fuel cell system. More specifically, it is a principal object of the invention to provide for humidification of reactant streams used in a fuel cell system in such a way that overall energy consumption of the fuel cell system is minimized.

An exemplary embodiment achieves the foregoing objects in a fuel cell system that includes a fuel cell having a hydrogen rich fuel inlet, an oxygen rich oxidant inlet, an anode tail gas outlet, and a cathode gas outlet. Included is a source of hydrogen rich fuel connected to the hydrogen rich fuel inlet and a source of oxygen rich gas connected to the oxygen rich oxidant inlet. At least one humidifier is interposed between at least one of the sources and its associated inlet and has a reactant flow path interconnecting the one source and the associated inlet in heat exchange relation with an energy containing medium flow path together with a source of aqueous material connected to the reactant flow path for introducing liquid aqueous material into the reactant flow path to be vaporized therein. The energy containing medium flow path is connected to one of the outlets to receive a heated fluid therefrom to provide the heat of vaporization to the liquid aqueous material by heat exchange between the two flow paths.

In one embodiment, there are at least two of the humidifiers, one connected between the fuel source and the fuel inlet and the other connected between the oxygen rich source and the oxidant inlet. The energy containing medium flow path of a first of the humidifiers is connected to the tail gas outlet and the energy containing medium flow path of a second of the humidifiers is connected to the cathode gas outlet.

In one embodiment, the first of the humidifiers has its energy containing medium flow path connected to the cathode gas outlet and its reactant flow path connected to the fuel source.

A preferred embodiment contemplates that the second of the humidifiers has its reactant flow path connected to the oxidant source.

In one embodiment, there is at least one additional humidifier having its reactant flow path connected in series with the reactant flow path of one of the at least two humidifiers and the fuel cell includes a coolant circuit for the circulation of coolant through the fuel cell. The energy containing medium flow path of the additional humidifier is connected in the coolant circuit.

An embodiment of the invention contemplates that there be two of the humidifiers having the reactant flow paths connected in series.

One embodiment of the invention contemplates that there be two of the humidifiers and which have their reactant flow path connected in series between the fuel inlet and the fuel source.

In another embodiment, there are two humidifiers having their reactant flow paths connected in series between the oxidant inlet and the source of oxygen rich gas.

The invention also contemplates that the source of aqueous material includes the energy containing medium flow path of the humidifier which is connected to the cathode gas outlet.

One embodiment of the invention contemplates a fuel cell system including a fuel cell having the inlets and outlets as mentioned before along with the source of fuel and oxidant together with a source of aqueous material for humidifying fuel and/or the oxygen rich gas. A humidifier is provided and has a reactant flow path extending from at least one of the fuel and oxidant sources and the aqueous material source to a corresponding one of the fuel cell inlets and an energy containing medium flow path in heat exchange relation with the reactant flow path and connected between the cathode gas outlet and the aqueous material source. As a result, an energy containing stream, typically water containing vapor, flowing from the cathode gas outlet through the energy containing medium flow path is condensed in the humidifier to provide aqueous material to said source for ultimate use as a humidifying agent in the humidifier reactant flow path as well as energy for vaporizing aqueous material in the reactant flow path of the humidifier.

Other objects and advantages will become apparent from the following specification taken in connection with the accompanying drawings.

DESCRIPTION OF THE PREFERRED EMBODIMENTS

Embodiments of the invention herein disclosed will be described in connection with a fuel cell system operating on pure hydrogen received from a tank containing liquid hydrogen. However, it is to be understood that the invention may be employed with efficacy in so-called reformer type systems wherein a reformer is employed to provide a hydrogen rich stream to the system fuel cell by converting a hydrogen-containing compound, typically an organic compound such as methanol, ethanol, propane, butane, natural gas, gasoline, diesel fuel, etc. into the hydrogen rich fuel stream. Consequently, no limitation to a pure hydrogen fuel cell system is intended except insofar as expressly stated in the claims hereof.

It is also to be observed that the invention may also be employed with efficacy in pre-treating reactant streams used in a fuel cell. For example, in reformer type systems that convert natural gas, propane, butane, etc. to the hydrogen rich fuel stream, to enhance the efficiency of the reforming process, it is frequently desirable to humidify the incoming natural gas, butane or propane stream; and the principles of the invention may be employed in connection with such humidification. Consequently, no limitation to the particular location within the system at which humidification occurs except insofar as stated in the appended claims.

It is also to be noted that the invention contemplates the use of humidifiers of varying constructions. One preferred form of humidifier is that disclosed in the commonly assigned application of Meissner et al, Ser. No. 10/115,343, filed on Apr. 3, 2002 and entitled "Contact Heater/Humidifier for Fuel Cell Systems", the entire disclosure of which is herein incorporated by reference.

Figure 1:
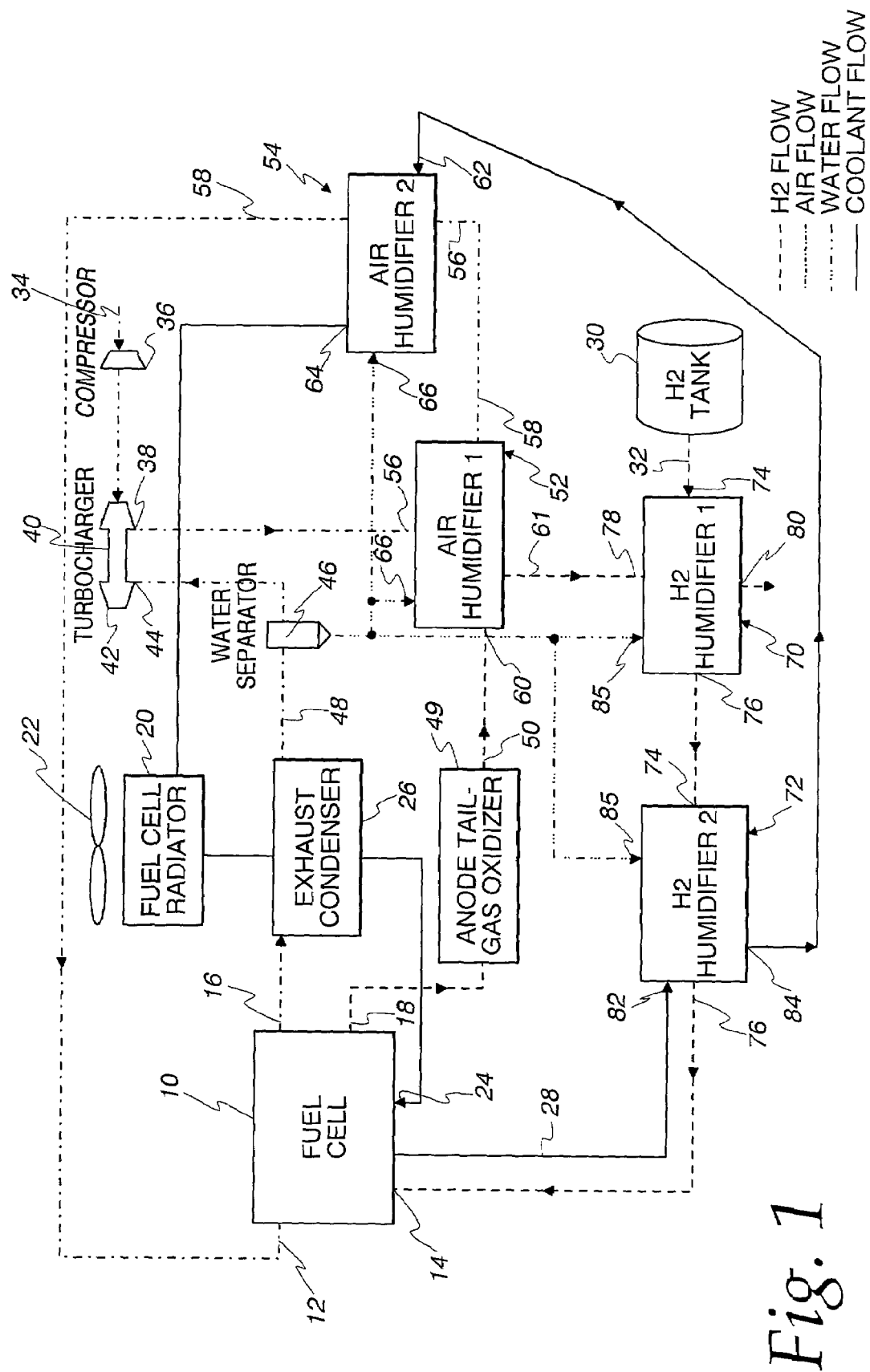
FIG. 1 is a schematic of one embodiment of a fuel cell system made according to the invention.

With the foregoing in mind, attention is directed to FIG. 1 wherein a first embodiment of a fuel cell system made according to the invention is illustrated. Included is a fuel cell, generally designated 10, which may be a single fuel cell or a plurality of fuel cells connected together as desired. The fuel cell includes an inlet 12 for an oxygen rich oxidant stream which typically will be air. Also included is an inlet 14 for fuel, which will typically be a hydrogen rich gas. An outlet 16 is the cathode gas outlet for the fuel cell 10 which, as is well known, provides an exhaust stream that is rich in water vapor and is at an elevated temperature. A further outlet 18 is the anode tail gas outlet which is a stream at elevated temperature and which includes unconsumed fuel, i.e., hydrogen.

In the usual case, a coolant circulation loop is provided for the fuel cell 10 to maintain a desired operating temperature therein. The coolant circulation loop includes a heat exchanger 20 which acts as a radiator and which may be provided with a fan 22 for driving cooling air through the heat exchanger 20. Coolant enters the fuel cell at an inlet 24 after being received in a relatively cool state from the fuel cell radiator 20 via an exhaust condenser 26 which is connected to the cathode gas outlet to receive cathode gas and condense the water vapor therein.

A coolant outlet 28 is provided from the fuel cell 10 through which hot coolant exits the fuel cell 10 to be recirculated through the radiator 20 via a path to be described in greater detail hereinafter.

A source 30 for fuel for the fuel cell 10 is illustrated in FIG. 1 in the form of a liquid hydrogen tank which discharges hydrogen on an outlet 32 for ultimate entry into the fuel cell 10 via the inlet 14. In a high pressure system such as that shown, the oxidant stream is provided by incoming air placed on an inlet 34 to a compressor 36 which discharges into the compressor side 38 of a turbocharger 40. The incoming air is thus pressurized and ultimately passed to the oxidant inlet 12 via a flow path to be described hereinafter. In low pressure systems, the turbocharger may be omitted.

The turbocharger 40 has a turbine side 42 which is driven by hot gas received by a nozzle 44 from a water separator 46. The water separator is connected via a line 48 to the outlet of the exhaust condenser 26 and thus receives the now, somewhat cooled cathode gas stream. Water vapor, having been condensed to a liquid in the exhaust condenser 26 is separated in the water separator 46 and reuse for humidification purposes. Non-condensible cathode gas is flowed through the turbine side 42 of the turbocharger 40 to drive the same to provide for compression of the incoming air stream.

The system also includes an anode tail gas oxidizer 49 which is connected to the tail gas outlet 18 to receive tail gas therefrom. The tail gas, which, it will be recalled, contains unspent fuel, is oxidized to provide a hot gas stream on a line 50.

To provide for humidification of the oxidant stream, first and second air humidifiers, generally designated 52 and 54, respectively, are provided. As noted previously, the humidifiers 52 and 54 may be made according to the construction illustrated in the commonly assigned application of Meissner et al. To this end, each includes a reactant inlet 56 and a reactant outlet 58. An interior reactant flow path located within each of the humidifiers 52 or 54, connects the associated inlet 56 and outlet 58 and is in heat exchange relation with an internal energy containing medium flow path. The energy containing medium flow path has an inlet 60 and an outlet 61 for the humidifier 52 and an inlet 62 and outlet 64 for the humidifier 54.

Each humidifier 52, 54, is also connected to the water separator and includes an aqueous material inlet 66 which is in fluid communication with the reactant flow path to inject water into the reactant therein flowing for vaporization by heat rejected to the reactant flow path from the energy containing medium flow path.

The fuel stream from the tank 30 is directed to the serial combination of two fuel humidifiers, generally designated 70 and 72, respectively. The humidifiers 70 and 72 have reactant inlets 74 and reactant outlets 76 connected within each humidifier 70, 72 by an associated reactant flow path. Thus, fuel from the source 30 is flowed through the humidifiers 70 and 72 via the internal reactant flow paths to the inlet 14 of the fuel cell 10.

In addition, the humidifier 70 includes an energy containing medium inlet 78 and an energy containing medium outlet 80 while the humidifier 72 includes an energy containing medium inlet 82 and an energy containing medium outlet 84 at opposite ends of respective energy containing medium flow paths within the humidifiers 70, 72 and which are in heat transfer relation with the reactant flow paths of the associated heat exchangers 70,72.

The energy containing medium inlet 78 of the humidifier 70 is connected to the energy containing medium outlet 61 of the humidifier 52 to receive anode tail gas after it is passed through the energy containing medium flow path of the humidifier 52. The anode tail gas will still be at an elevated temperature and thus is used as a source of heat within the humidifier 70 for vaporization of aqueous material therein.

An aqueous material inlet 85 is provided to each of the humidifiers 70,72 and injects aqueous material from the water separator 46 into the reactant flow path of each of the humidifiers 70,72 to provide for humidification of the fuel prior to its admission to the fuel cell 10 via the inlet 14. In the case of the humidifier 70, the aqueous material is vaporized by heat rejected by the anode tail gas within the humidifier 70.

The energy containing medium inlet 82 of the humidifier 72 is connected to the coolant outlet 28 for the fuel cell 10 and further discharges the coolant through the outlet 84 to the energy containing medium inlet 62 for the humidifier 54. The coolant is returned via the outlet 64 to the radiator 20 for recirculation. Thus, coolant for the fuel cell 10 is utilized as a source of heat to be rejected from the energy containing medium flow path to the reactant flow path within the humidifiers 54 and 72.

The invention has a number of advantages over prior constructions. For one, otherwise waste heat in the tail gas is employed as a source for humidification of reactant streams as they pass through the humidifiers 52 and 70, thereby providing a conservation of energy. Furthermore, the use of two humidifiers in the fuel stream and two humidifiers in the oxygen rich stream provides a number of advantages. In some installations, as, for example, in vehicular installations where volume constraints may be present, rather than use one single large humidifier, the humidifiers may be broken into separate components to be located where space exits. Even more importantly, the use of two humidifiers in series provides a guarantee that the required humidity and temperature constraints for proper operation of the fuel cell 10 may be readily met.

Figure 2:
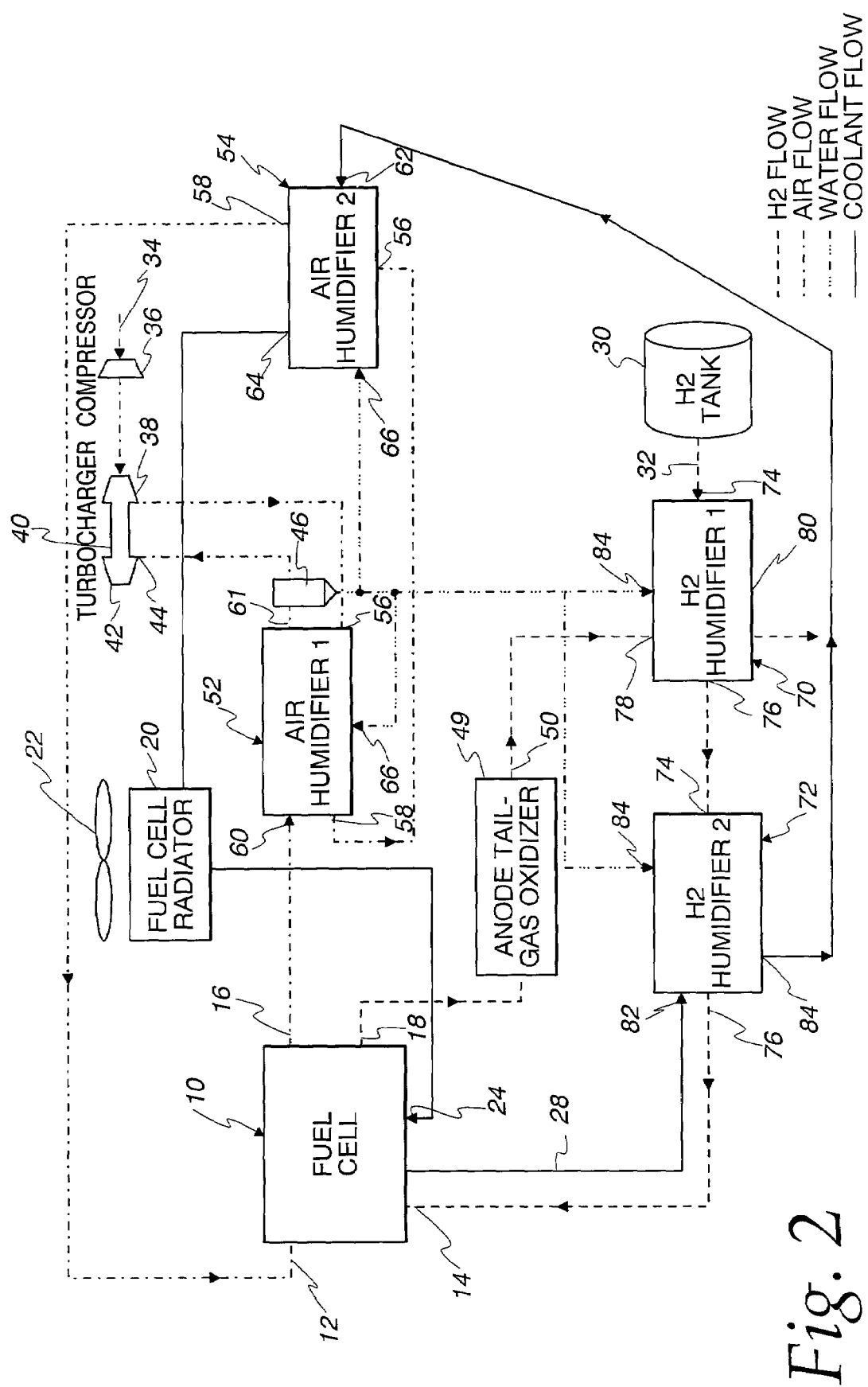
FIG. 2 is a schematic of an alternate embodiment of a fuel cell system made according to the invention.

Turning now to FIG. 2, an alternative embodiment is illustrated. Where like components are employed, they will not be re-described and will be given the same reference numerals in the interest of brevity.

The embodiment of FIG. 2 is generally similar to that of FIG. 1 but differs in a couple of material respects. For one, the exhaust condenser 26 (FIG. 1) is not employed in the embodiment of FIG. 2. Rather, cathode gas from the outlet 16 is routed directly to the energy containing medium flow path of the first air humidifier 52 which extends between the inlet 60 and the outlet 61 thereof. The latter is, in turn connected to the water separator 46 with the first air humidifier 52, and specifically, the energy containing medium flow path thereof, serving as a condenser to condense out water vapor in the cathode gas stream. In this instance, the latent heat of vaporization of the aqueous material released from the cathode gas stream provides energy for vaporization of aqueous material in the reactant flow path. The aqueous material separated in the water separator 46 is then routed to various humidifiers in the same fashion mentioned previously and the non-condensible gas again used on the turbine side 42 of the turbocharger 40 to elevate the pressure of the incoming air stream.

In the embodiment of FIG. 2, anode tail gas from the oxidizer 48 is not employed as a heat source for the air humidifier 52 as in the embodiment of FIG. 1. Rather, it is routed directly to the energy containing medium fluid inlet 78 of the humidifier 70 and to the energy containing medium flow path within the same interconnecting the inlet 78 and the outlet 80.

In the case of both embodiments, spent anode tail gas departing the outlet 80 of the humidifier 70 may be discharged after being treated, if necessary, as may be required.

The embodiment of FIG. 2 retains all of the advantages listed previously in connection with the description of the embodiment of FIG. 1 and provides a further advantage in that it omits the need for the exhaust condenser 26 while retaining its function in the energy containing medium flow path of the first air humidifier 52. Not only is the cost and volume occupied by the exhaust condenser done away with, the coolant loop is simplified in that the radiator 20 may be connected more directly to the coolant inlet 24 of the fuel cell 10.

The invention claimed is:

1. A fuel cell system, comprising:
 a fuel cell having
  a hydrogen rich fuel inlet,
  an oxygen rich oxidant inlet,
  an anode tail gas outlet, and
  a cathode gas outlet;
 a source of hydrogen rich fuel connected to said hydrogen rich fuel inlet;
 a source of oxygen rich gas for said oxygen rich oxidant inlet; and
 at least one humidifier interposed between at least one of said sources and its associated inlet and having a reactant flow path interconnecting said one source and said associated inlet in heat exchange relation with an energy containing medium flow oath, and a source of aqueous material con- nected to said reactant flow path for introducing liquid aqueous material into said reactant flow oath to be vaporized therein;
 said energy containing medium flow path being connected to one of said outlets to receive a heated fluid therefrom to provide heat of vaporization to said liquid aqueous material by heat exchange between said flow paths wherein there are two said humidifiers having their reactant flow paths connected in series.

2. The fuel cell system of claim 1 wherein there are said two said humidifiers having their reactant flow paths connected in series between said fuel inlet and said fuel source.

3. The fuel cell system of claim 1 wherein there are two said humidifiers having their reactant flow paths connected in series between said oxidant inlet and said source of oxygen rich gas.

4. A fuel cell system, comprising:
 a fuel cell having
  a hydrogen rich fuel inlet,
  an oxygen rich oxidant inlet,
  an anode tail gas outlet, and
  a cathode gas outlet;
 a source of hydrogen rich fuel connected to said hydrogen rich fuel inlet;
 a source of oxygen rich gas for said oxygen rich oxidant inlet; and
 at least one humidifier interposed between at least one of said sources and its associated inlet and having a reactant flow path interconnecting said one source and said associated inlet in heat exchange relation with an energy containing medium flow path, and a source of aqueous material connected to said reactant flow path for introducing liquid aqueous material into said reactant flow path to be vaporized therein;

said energy containing medium flow path being connected to one of said outlets to receive a heated fluid therefrom to provide heat of vaporization to said liquid aqueous material by heat exchange between said flow paths wherein said source of aqueous material includes the energy containing medium flow path of said humidifier which is connected to said cathode gas outlet to receive a cathode exhaust fluid flow therefrom.

5. A fuel cell system, comprising:
a fuel cell having
   a hydrogen rich fuel inlet,
   an oxygen rich oxidant inlet,
   an anode tail gas outlet, and
   a cathode gas outlet;
a source of hydrogen rich fuel connected to said hydrogen rich fuel inlet;
a source of oxygen rich gas for said oxygen rich oxidant inlet; and
a source of aqueous material for humidifying fuel and/or oxygen rich gas;
a humidifier having a reactant flow path connected between at least one of said fuel and gas sources and to said aqueous material source and a corresponding one of said inlets and an energy containing medium flow path in heat exchange relation with said reactant flow path and connected between said cathode gas outlet and said aqueous material source;
whereby vaporized aqueous material flowing as cathode exhaust from said cathode gas outlet through said energy containing medium flow path is condensed in said humidifier to provide aqueous material to said source for ultimate use as a humidifying agent in said humidifier reactant flow path.

6. The fuel cell system of claim 5 wherein said reactant flow path is interposed between said oxygen rich gas source and said oxygen rich oxidant inlet.

7. The fuel cell system of claim 5 wherein said aqueous material source includes a separator receiving outflow from said energy containing medium flow path.

8. The fuel cell system of claim 7 further including a turbine operated compressor connected to receive and be driven by gas from said separator and to deliver compressed air to said reactant flow path to thereby serve as said oxygen rich gas source.

9. A fuel cell system, comprising:
a fuel cell having
   a hydrogen rich fuel inlet,
   an oxygen rich oxidant inlet,
   an anode tail gas outlet, and
   a cathode gas outlet;
a source of hydrogen rich fuel connected to said hydrogen rich fuel inlet;
a source of oxygen rich gas for said oxygen rich oxidant inlet; and
first and second oxygen rich gas humidifiers and first and second fuel humidifiers each having a reactant flow path in heat exchange relation with an energy containing fluid medium flow path, the gas humidifiers having their reactant flow paths connected in series and located between said oxidant inlet and said gas source, and the fuel humidifiers having their reactant flow paths connected in series and located between said fuel source and said fuel inlet;
a water source connected to the reactant flow paths of each of said humidifiers;
a coolant circulation loop connected to said fuel cell to receive heat rejected therefrom;
the energy containing medium flow paths of said second oxygen rich gas humidifier and said second fuel humidifier being connected in said coolant circulation loop;
the energy containing medium flow path of said first oxygen rich gas humidifier being connected between said cathode gas outlet and said water source; and
the energy containing medium flow path of said first fuel humidifier being connected to said tail gas outlet.

10. The fuel cell system of claim 9 wherein said water source includes a separator connected to an outlet of said first oxygen rich gas humidifier energy containing medium flow path.

11. A fuel cell system, comprising:
a fuel cell having
   a hydrogen rich fuel inlet,
   an oxygen rich oxidant inlet,
   an anode tail gas outlet, and
   a cathode gas outlet;
a source of hydrogen rich fuel connected to said hydrogen rich fuel inlet;
a source of oxygen rich gas for said oxygen rich oxidant inlet; and
first and second oxygen rich gas humidifiers and first and second fuel humidifiers each having a reactant flow path in heat exchange relation with an energy containing fluid medium flow path, the gas humidifiers having their reactant flow paths connected in series and located between said oxidant inlet and said gas source, and the fuel humidifiers having their reactant flow paths connected in series and located between said fuel source and said fuel inlet;
a water source connected to the reactant flow paths of each of said humidifiers;
a coolant circulation loop connected to said fuel cell to receive heat rejected therefrom;
the energy containing medium flow paths of said second oxygen rich gas humidifier and said second fuel humidifier being connected in said coolant circulation loop; and
the energy containing medium flow paths of said first oxygen rich gas and said first fuel humidifiers being connected to said tail gas outlet.

12. The fuel cell system of claim 11 including a condenser interposed between said cathode gas outlet and said water source and located in said coolant circulation loop.

* * * * *

UNITED STATES PATENT AND TRADEMARK OFFICE
CERTIFICATE OF CORRECTION

| | |
|---|---|
| PATENT NO. | : 7,037,610 B2 |
| APPLICATION NO. | : 10/246223 |
| DATED | : May 2, 2006 |
| INVENTOR(S) | : Alan P. Meissner et al. |

It is certified that error appears in the above-identified patent and that said Letters Patent is hereby corrected as shown below:

Column 6, line 33, delete "oath" and substitute therefor --path--; and line 36, delete "oath" and substitute therefor --path--.

Signed and Sealed this

Third Day of April, 2007

JON W. DUDAS
*Director of the United States Patent and Trademark Office*